United States Patent [19]

Masuda et al.

[11] 4,306,898
[45] Dec. 22, 1981

[54] GLASS RIBBON WIDTH CONTROL METHOD IN FLOAT PROCESS

[75] Inventors: Hiroshi Masuda; Hirohiko Sakai; Syoji Saito, all of Matsusaka, Japan

[73] Assignee: Central Glass Company, Limited, Ube, Japan

[21] Appl. No.: 154,052

[22] Filed: May 28, 1980

[30] Foreign Application Priority Data

Jun. 2, 1979 [JP] Japan .................................. 54-69306

[51] Int. Cl.³ ............................................. C03B 18/04
[52] U.S. Cl. ........................................ 65/29; 65/99 A; 65/182.3; 65/182.4
[58] Field of Search ................. 65/99 A, 29, 182–183, 65/182.4

[56] References Cited

U.S. PATENT DOCUMENTS 4,030,902  6/1977  Nagae .......................... 65/182.4 X Primary Examiner—Arthur D. Kellogg
Attorney, Agent, or Firm—Lowe, King, Price & Becker

[57] ABSTRACT

In a float process of flat glass production, the width of glass ribbon is controlled by regulating a tweel to manipulate the rate of supplying a molten glass through the tweel onto a molten metal bath. To minimize a fluctuation of the glass ribbon width, either of two different control modes, an integral control mode and a proportional-plus-integral control mode, is employed depending on whether or not an error between a measured width and a desired value is within a predetermined range of the error. Preferably the method of the present invention is achieved according to a sampled-data control system.

5 Claims, 4 Drawing Figures

GLASS RIBBON WIDTH CONTROL METHOD IN FLOAT PROCESS

BACKGROUND OF THE INVENTION

The present invention relates to a method for controlling the width of a glass ribbon manufactured through a float process and more particularly to a control method in which the rate of supplying a molten glass onto a molten metal in a bath is manipulated by regulating the height or opening of a tweel so as to reduce an error between a measured glass ribbon width and a predetermined standard width.

Because a molten glass in general has a high viscosity, a glass ribbon on a molten metal does not exhibit a stable width when hot just after discharged onto the molten metal bath. Accordingly a detecting device to find a glass ribbon width by detecting positions of both side edges of the glass ribbon must be placed sufficiently distant from the tweel to the downstream and therefore there is a substantial time delay between a change of the tweel height and a responsive change of the glass ribbon width.

In such a process the value of the glass ribbon width tends to oscilate in a large amplitude alternately going over and under a standard value and therefore it has been very difficult to maintain satisfactorily the glass ribbon width uniform.

A fluctuation of the glas ribbon width causes an increase of area of the both side portions of the glass ribbon which must be trimmed off for final products, resulting in a decreased yield of flat glass products. In some cases the glass ribbon on the molten metal bath is held at the both side portions thereof by supporting rolls or the like and this causes a further increase of the trimmed off portions.

SUMMARY OF THE INVENTION

It is therefore an object of the present invention to provide a method for controlling the width of a glass ribbon produced through a float process which method is so devised to minimize a fluctuation of the glass ribbon width and enhance the yield of flat glass products.

In a float process of flat glass production, a molten glass is poured through a movable tweel or sluice gate onto a molten metal in a bath to form a floating glass ribbon which advances along the molten metal bath and is gradually cooled until it becomes dimensionally stable.

To minimize a fluctuation of the glass ribbon width in such a float process, the present invention proposes the control method which comprises the steps of;

detecting the width of the glass ribbon at a location remote from the tweel, comparing the detected width with a predetermined standard and generating an error signal representing the error therebetween, discriminating between a first case where said error signal is within a predetermined range of the error and a second case where said error signal is outside said range, generating a first control signal in accordance with an integral control mode in the case of said first case and generating a second control signal in accordance with a proportional-plus-integral control mode of a sampled data system in the case of said second case, regulating the tweel to manipulate the rate of supplying a molten glass to the bath under command of said first control signal in the case of said first case and under command of said second control signal in the case of said second case.

DESCRIPTION OF THE PREFERRED EMBODIMENTS

Figure 1:
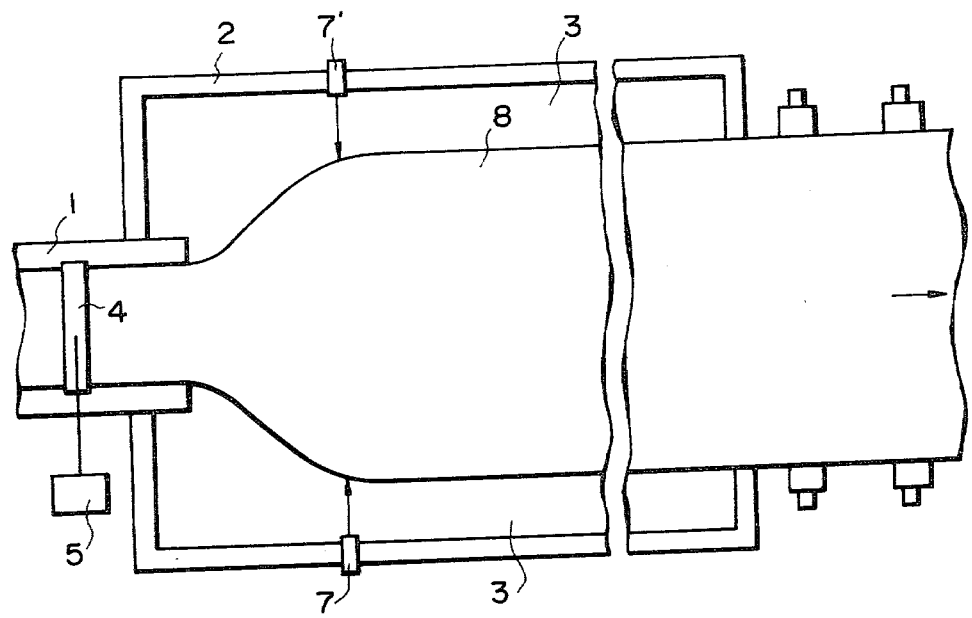
FIG. 1 is a schematic plan view showing a molten metal bath chamber.
Figure 2:
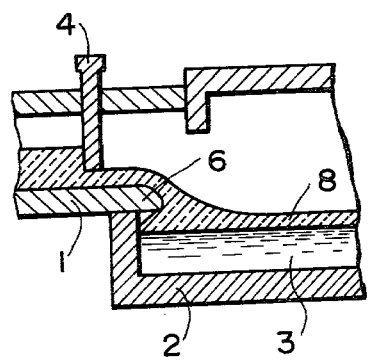
FIG. 2 is a longitudinal section of a portion of FIG. 1.
Figure 3:
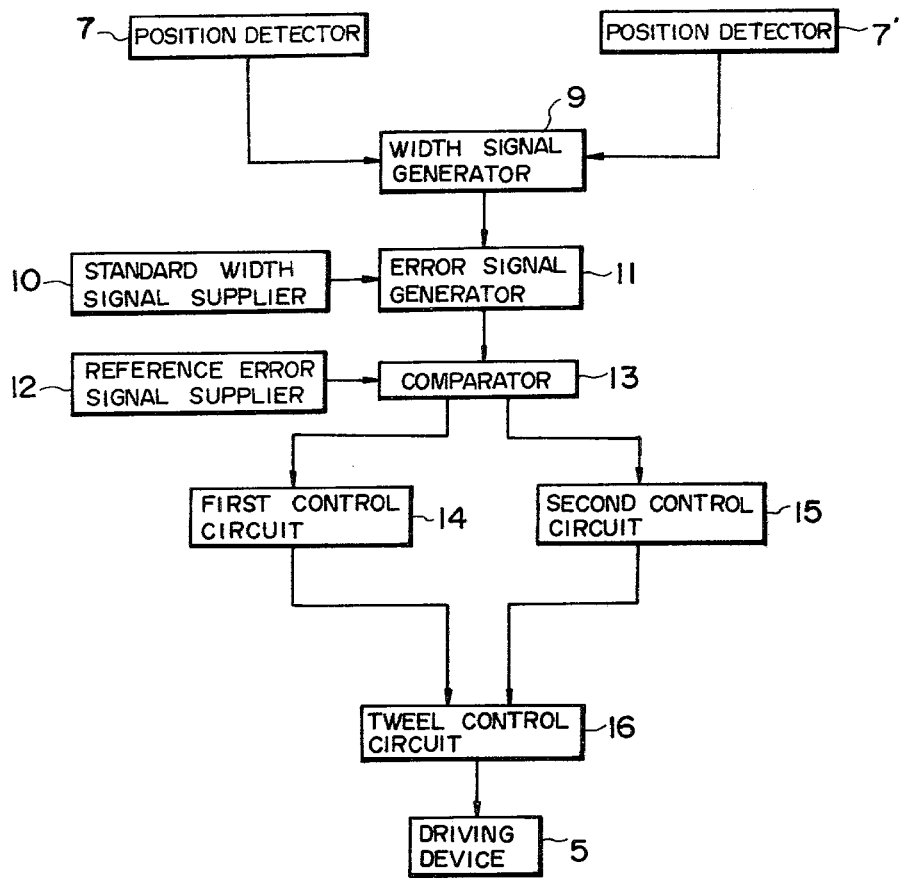
FIG. 3 is a block diagram according to the present invention.

Referring to FIGS. 1-3, a canal 1 connects a melting furnace or tank (not shown) making a molten glass with a bath chamber 2 having a molten metal bath 3 therein. And there is provided in the canal 1 a tweel or sluice gate 4 which is movable up and down by the aid of a driving device 5 and also there is provided at the end of the canal 1 a lip tile 6. At a location sufficiently distant from the lip tile 6 to the downstream along the molten metal bath there are placed a pair of photoelectric position detectors, 7,7' such as video-analizers confronting each other with the glass ribbon between for detecting positions of both side edges and producing position signals.

Reference numeral 9 is a width signal generator circuit which carries out arithmetic operation receiving as its input the position signals from the video-analizers as inputs and generates a width signal representing the width of the glass ribbon 8. Reference numeral 10 is a standard width signal supplier circuit which generates a predetermined standard width signal and reference numeral 11 is an error signal generator circuit which compares the width signal with the standard width signal and generates an error signal responsive to the comparison. Reference numeral 12 is a reference error signal supplier circuit which generates a reference error signal representing a predetermined admissible range (for example, ±R in FIG. 4) of the error between the detected glass ribbon width and the standard and reference numeral 13 is a comparator circuit which compares the error signal from the circuit 11 with the reference error signal from the circuit 12 and transmits the error signal, when the error signal is within the admissible range of the error, to a first control circuit 14 which generates a first control signal which is proportional to an average value of a series of the error signals or the time integral of the error signal and transmits the error signal to a second control circuit which generates a second control signal in accordance with a control mode of a proportional-plus integral action, of a sampled-data system, when the error signal is out of the range of the error. Reference numeral 16 is a tweel control circuit which receives either of the first and second control signals from the first control circuit 14 or the second control circuit 15 and activates the driving device 5 to move the tweel up and down to maintain the width of the glass ribbon 8 uniform.

Figure 4:
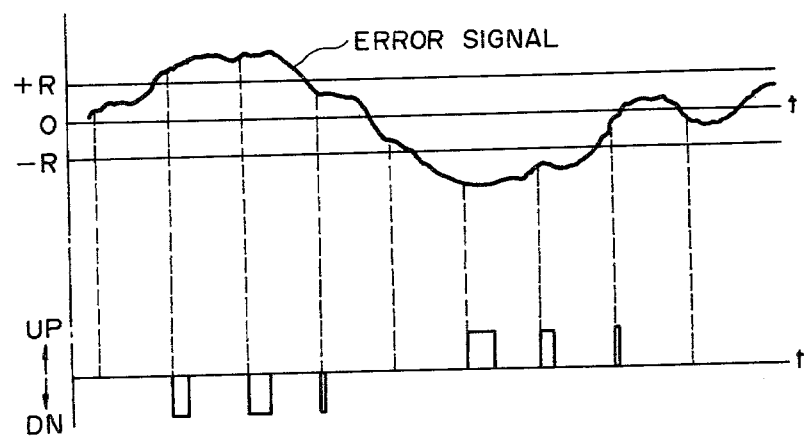
FIG. 4 is a schematic diagram showing an example of the relationship between the error signal and the control signal.

Referring to FIG. 4, reference letter 0 denotes the standard width of the glass ribbon and +R and −R denote respectively an upper set point and a lower set point of the admissible range of the error. Preferably the tweel 4 is regulated to move up or down in predetermined control cycles, as shown by broken lines, and the control cycle time is chosen slightly greater than the length of time from a change of the tweel height to a responsive change of the glass ribbon width, that is, a time necessary for a molten glass to travel from the tweel 4 to the location of the video-analizers. Preferably the error signal is generated once in every sampling period which is chosen much smaller than the control cycle time. In this case, the sampled data system of the second control circuit periodically picks up the error signals as sampled data.

In the thus arranged control system, the error signal generator circuit 11 generates an error signal, for example, when the detected width of the glass ribbon 8 goes beyond the standard width because of an increase of the amount of molten glass poured from the canal 1 through the tweel 4 onto the molten metal. And if this error signal is within the admissible range (for example, 0 to +R in FIG. 4), then the first control circuit receives the error signal and is brought into operation to generate a first control signal in accordance with its control mode. The tweel is regulated to move down in response to this control signal from the first control circuit 11. If the error signal is over the admissible range (for example, greater than +R in FIG. 4), then the second control circuit 15 receives the error signal and is brought into operation to generate a second control signal, as shown as rectangular pulse signals in FIG. 4, in accordance with its control mode. And the tweel is moved down during a time interval represented the pulse width of the control signal. Almost the same operational process is carried out when the tweel is moved up because of a decrease of the molten glass amount.

In the above mentioned embodiment, the video analizers 7, 7' are employed to detect positions of both side edges of the glass ribbon but this invention is not limited by this.

According to the present invention, as will be understood from the foregoing description, the range of the error between the glass ribbon width and the desired standard is predetermined and to minimize a fluctuation of the glass ribbon width the control mode is changed depending on whether or not the error signal is within the predetermined range. That is, when the error signal is within the predetermined range, the tweel is regulated by the control signal which is generated by the first control circuit on the basis of the average value of the error signal or the integral of the error signal, so that the tendency toward a fluctuation of the glass ribbon width is restrained. When the error signal is outside the predetermined range, the control signal is generated by the second control circuit in accordance with a proportional-plus-integral control mode, of a sampled-data system, so that the glass ribbon width is reliably prevented from going further beyond the predetermined admissible range. Thus, according to the present invention, the fluctuation of the glass ribbon width is minimized and therefore the yield of flat glass products is enhanced.

What is claimed is:

1. A method for controlling the width of a glass ribbon in a float process of flat glass production in which a molten glass is poured through a tweel onto a molten metal in a bath to form a glass ribbon floating and advancing on the molten metal bath, the method comprising:

detecting the width of the glass ribbon at a location remote from the tweel, comparing the detected width with a predetermined standard and generating an error signal representing the error therebetween, discriminating between a first case where said error signal is within a predetermined range of the error and a second case where said error signal is outside said range, generating a first control signal from said error signal in accordance with an integral control mode in the case of said first case and generating a second control signal from said error signal in accordance with a proportional-plus-integral control mode of a sampled data system in the case of said second case, and regulating the tweel to manipulate the rate of supplying a molten glass to the bath under command of said first control signal in the case of said first case and under command of said second control signal in the case of said second case in such a manner as to maintain the glass ribbon width uniform.

2. A method as claimed in claim 1, wherein said error signal is generated periodically once every predetermined sampling period, and wherein said error signal is further sampled periodically to generate said second control signal.

3. A method as claimed in claim 2, wherein each of said first and said second control signals is generated periodically once every predetermined control period.

4. A method as claimed in claim 3, wherein said sampling period is much smaller than said control period.

5. A method as claimed in claim 4, wherein said control period is slightly greater than a time interval necessary for a molten glass to advance from the location of the tweel to the location where the width of the glass ribbon is detected.

* * * * *